United States Patent
Saito et al.

(10) Patent No.: US 10,869,469 B2
(45) Date of Patent: Dec. 22, 2020

(54) DRAG KNOB AND FISHING REEL

(71) Applicant: Shimano Inc., Sakai (JP)

(72) Inventors: Kei Saito, Sakai (JP); Tomoya Deguchi, Sakai (JP)

(73) Assignee: SHIMANO INC., Sakai (JP)

(*) Notice: Subject to any disclaimer, the term of this patent is extended or adjusted under 35 U.S.C. 154(b) by 181 days.

(21) Appl. No.: 16/211,615

(22) Filed: Dec. 6, 2018

(65) Prior Publication Data
US 2019/0191684 A1    Jun. 27, 2019

(30) Foreign Application Priority Data

Dec. 27, 2017 (JP) ................. 2017-250530

(51) Int. Cl.
*A01K 89/027* (2006.01)

(52) U.S. Cl.
CPC .................. *A01K 89/027* (2013.01)

(58) Field of Classification Search
CPC ........... A01K 89/03; A01K 89/0111; A01K 89/0113; A01K 89/0122; A01K 89/0126; A01K 89/027
See application file for complete search history.

(56) References Cited

U.S. PATENT DOCUMENTS

| | | | | |
|---|---|---|---|---|
| 4,549,702 A * | 10/1985 | Councilman | ...... | A01K 89/0123 242/246 |
| 4,796,828 A * | 1/1989 | Councilman | .... | A01K 89/01123 242/245 |
| 4,813,626 A * | 3/1989 | Sakumoto | ............. | A01K 89/02 242/245 |
| 4,930,723 A * | 6/1990 | Toda | .................... | A01K 89/027 242/223 |
| 4,938,433 A * | 7/1990 | Toda | .................... | A01K 89/029 242/245 |
| 5,348,245 A * | 9/1994 | Sugawara | ............ | A01K 89/027 242/233 |
| 2003/0136867 A1* | 7/2003 | Kitajima | ............ | A01K 89/0111 242/310 |
| 2004/0206840 A1* | 10/2004 | Kitajima | ................ | A01K 89/01 242/306 |
| 2005/0145735 A1* | 7/2005 | Ikuta | ...................... | A01K 89/01 242/307 |

(Continued)

FOREIGN PATENT DOCUMENTS

| | | |
|---|---|---|
| EP | 1479292 A2 | 11/2004 |
| JP | 2006-136216 A | 6/2006 |

OTHER PUBLICATIONS

British Search Report of the corresponding British Application No. GB1820661.5, dated Jun. 11, 2019., 3 pp.

*Primary Examiner* — Emmanuel M Marcelo

(74) *Attorney, Agent, or Firm* — United IP Counselors, LLC

(57) ABSTRACT

A drag knob includes an operating member and a sounding member. The operating tuber has a cover, an insert, and a bolt serving as a fixing member for fixing the cover to the insert. The operating member is rotatably attached to a reel body. The sounding member produces a percussive sound by rotation of the operating member. The operating member has a knob that extends in a radial direction. The bolt and the sounding member are disposed so as to overlap with the knob when viewed in an axial direction.

12 Claims, 8 Drawing Sheets

(56) References Cited

U.S. PATENT DOCUMENTS

| 2014/0151483 A1* | 6/2014 | Hiraoka | A01K 89/027 242/244 |
| 2015/0060586 A1* | 3/2015 | Takamatsu | A01K 89/02 242/285 |

\* cited by examiner

DRAG KNOB AND FISHING REEL

CROSS-REFERENCE TO RELATED APPLICATIONS

This application claims priority to Japanese Patent Application No. 2017-250530, filed Dec. 27, 2017. That application is incorporated by reference in its entirety.

BACKGROUND

Technical Field

The present disclosure relates to a drag knob, and in particular to a drag knob for adjusting the drag force of a drag mechanism by being screwed into the front end of a spool shaft on which is mounted a spool of a spinning reel.

Background Information

A fishing reel is generally provided with a drag mechanism for braking the rotation of a spool. The drag mechanism can regulate the drag force by rotation of the drag knob. For example, a drag knob having a sounding mechanism is disclosed in Japanese Laid Open Patent Application No. 2006-136216 (Patent Document 1). When the drag knob described in this publication is rotated, a striking pin provided in the sounding mechanism repeatedly makes contact with sounding recesses, whereby sound is produced.

BRIEF SUMMARY

In a fishing reel having the above-described configuration, it is preferable to improve the economic efficiency, design, and operability of the drag knob. In view of the above, it is an object of the present disclosure to improve the economic efficiency, design, and operability of the drag knob.

A drag knob according to the first aspect of the present disclosure is configured so as to regulate the drag force of a drag mechanism that brakes rotation of a spool rotatably attached to a reel body of a fishing reel. This drag knob is provided with an operating member and a sounding member. The operating member has a cover, an insert that is attached to the cover, and a fixing member for attaching the cover to the insert. The operating member is rotatably attached to the reel body, and the sounding member produces a percussive sound by rotation of the operating member. The cover has a knob that extends in a radial direction thereof. The fixing member and the sounding member are disposed so as to overlap with the knob when viewed in an axial direction.

In a conventional drag knob in which the operating member is constituted from a single member, since only the knob is operated, only the knob undergoes frictional wear, particularly when the knob is operated while wearing fishing gloves. In addition, dropping of the drag knob can lead to damage to the knob. Such a case could require replacement of the entire drag knob, which is problematic in terms of economic efficiency. In addition, since the drag knob is located on the front of the fishing reel, design-related problems arise. In a case where an operating member was constituted by a cover and an insert in order to resolve these problems, the fixing members for fixing the cover and the insert were disposed so as to overlap with the knob, while the sound member was arranged at a position not overlapping with the knob. That is, as viewed in the axial direction, the sounding member is arranged to the side of the knob.

In contrast, in the drag knob according to the present disclosure, the operating member comprises a cover and an insert attached to the cover. According to this configuration, when the knob wears out, it is sufficient to replace only the knob. In the drag knob according to the present disclosure, since the operating member is divided into the cover and the insert, it is possible to adopt various designs. Furthermore, in the drag knob according to the present disclosure, the fixing member and the sounding member are disposed so as to overlap with the knob when viewed in the axial direction. Therefore, it is possible to secure a space at the position where the sounding member was disposed in the conventional drag knob. Since it is possible to grab the knob by placing a user's fingers on this secured space, it is easy to grab the knob of the drag knob. As a result, it is possible to improve the economic efficiency, design, and operability of the drag knob.

The knob preferably has a first end and a second end in the radial direction. The sounding member is disposed so as to overlap with the first end side of the knob when viewed in the axial direction. The fixing member is disposed so as to overlap with the second end side of the knob when viewed in the axial direction.

The fixing member preferably has at least one bolt. The fixing member is disposed only in an area overlapping with the knob when viewed in the axial direction.

The fixing member preferably has only one bolt.

The drag knob preferably further has a receiving member. The receiving member has a plurality of recesses arranged in a circumferential direction thereof. The receiving member is non-rotatably attached to the reel body. The sounding member has a striking pin and a biasing member that biases the striking pin toward each recess of the receiver member.

A fishing reel according to a second aspect of the present disclosure is provided with a reel body, a spool that is rotatably mounted on the reel body, any one of the aforementioned drag knobs, and a drag mechanism that brakes rotation of the spool.

According to the present disclosure, it is possible to improve the economic efficiency, design, and operability of the drag knob.

DETAILED DESCRIPTION OF EMBODIMENTS

A preferred embodiment of a spinning reel will be described with reference to the drawings. Note that in the description that follows, unless otherwise specified, "axial direction" denotes the direction in which rotation center O of a rotor 13 extends, "radial direction" denotes the radial direction of a circle around the rotation center O, and "circumferential direction" denotes the circumferential direction of a circle centered on the rotation axis. In addition, "front" denotes the direction in which a fishing line is cast (the left direction in FIG. 1), while "rear" refers to the opposite direction (the right direction in FIG. 1).

[Spinning Reel]

Figure 1:
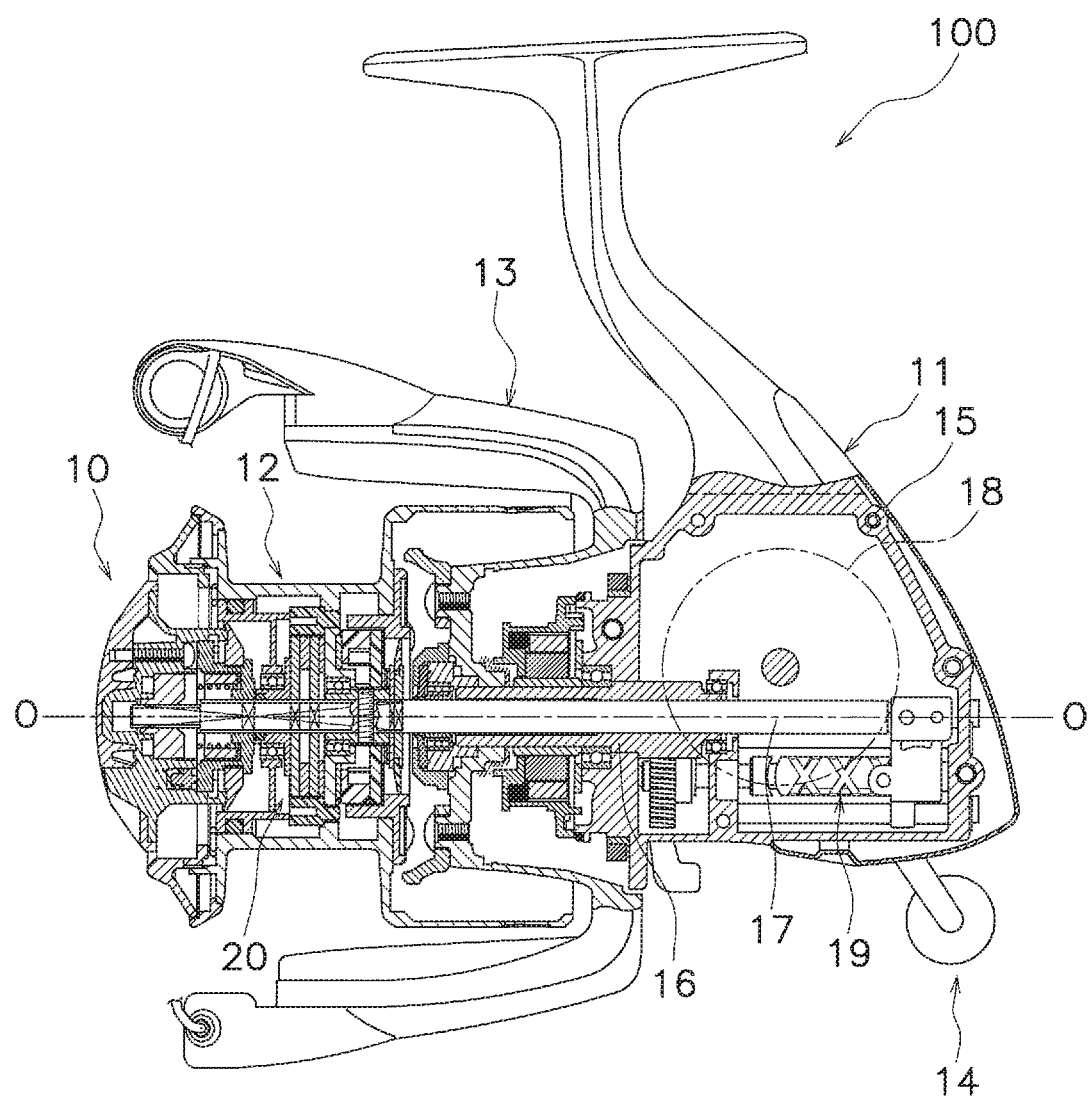
FIG. 1 is a cross-sectional view of a spinning reel.

As shown in FIG. 1, a spinning reel 100 reels out fishing line to the front (to the left in FIG. 1). The spinning reel 100 includes a reel body 11, a spool 12, a rotor 13, a handle 14, and a drag knob 10.

[Reel Body]

The reel body 11 has a housing 15, a pinion gear 16, and a spool shaft 17. The reel body 11 also has a drive gear 18, an oscillating mechanism 19, and the like.

The housing 15 has an internal space, and houses various mechanisms in the internal space. For example, the drive gear 18, the oscillating mechanism 19, and the like are housed in the housing 15. The handle 14 is rotatably attached to a side surface of the housing 15. By rotating the handle 14, the drive gear 18 rotates. The drive gear 18 is a face gear and meshes with a gear portion of the pinion gear 16. The oscillating mechanism 19 is a mechanism for causing the spool shaft 17 to move back and forth in the axial direction.

The spool shaft 17 is attached to the housing 15. The spool shaft 17 is movable in the front-rear direction. It should be noted that the spool shaft 17 does not rotate about the rotation center O. The spool shaft 17 extends forward from the interior of the housing 15. The center axis of the spool shaft 17 substantially coincides with the rotation center O. The spool shaft 17 reciprocates back and forth by rotating the handle 14. Specifically, the rotation of the handle 14 causes the spool shaft 17 to reciprocate rearward and frontward via the drive gear 18 and the oscillating mechanism 19.

At a distal end of the spool shaft 17, screw threads are formed on the outer peripheral surface thereof. The distal end of the spool shaft 17 has a pair of flat surfaces on the outer peripheral surface. The pair of flat surfaces extends parallel to each other.

The pinion gear 16 is attached to the housing 15. The pinion gear 16 is rotatable about the rotation center O. The pinion gear 16 extends forward from inside the housing 15. The pinion gear 16 is formed in a cylindrical shape. The spool shaft 17 passes through the interior of the pinion gear 16. The pinion gear 16 is preferably supported by the housing 15 via a plurality of bearings.

[Spool 12]

The spool 12 is a member around which the fishing line is wound. The spool 12 is rotatably attached to the reel body 11. More specifically, the spool 12 is attached to the spool shaft 17. The spool 12 is integrally reciprocated with the spool shaft 17 in the front-rear direction.

The spool 12 is rotatable with respect to the spool shaft 17. The spool 12 is mounted on the spool shaft 17 via a drag mechanism 20. The rotation of the spool 12 is braked by the drag mechanism 20. The drag mechanism 20 has a plurality of friction plates. The rotation of the spool 12 is braked by the mutual frictional engagement of the friction plates. For example, some of the friction plates are attached to the spool shaft 17 in a non-rotatable manner.

[Rotor 13]

The rotor 13 is a member for winding the fishing line onto the spool 12. The rotor 13 is rotatably attached to the reel body 11. More specifically, the rotor 13 is fixed to the pinion gear 16 and rotates together with the pinion gear 16.

[Drag Knob]

The drag knob 10 is a member for adjusting the drag force of the drag mechanism 20. By rotating the drag knob 10 about the rotation center O, the drag force of the drag mechanism 20 can be regulated.

Figure 2:
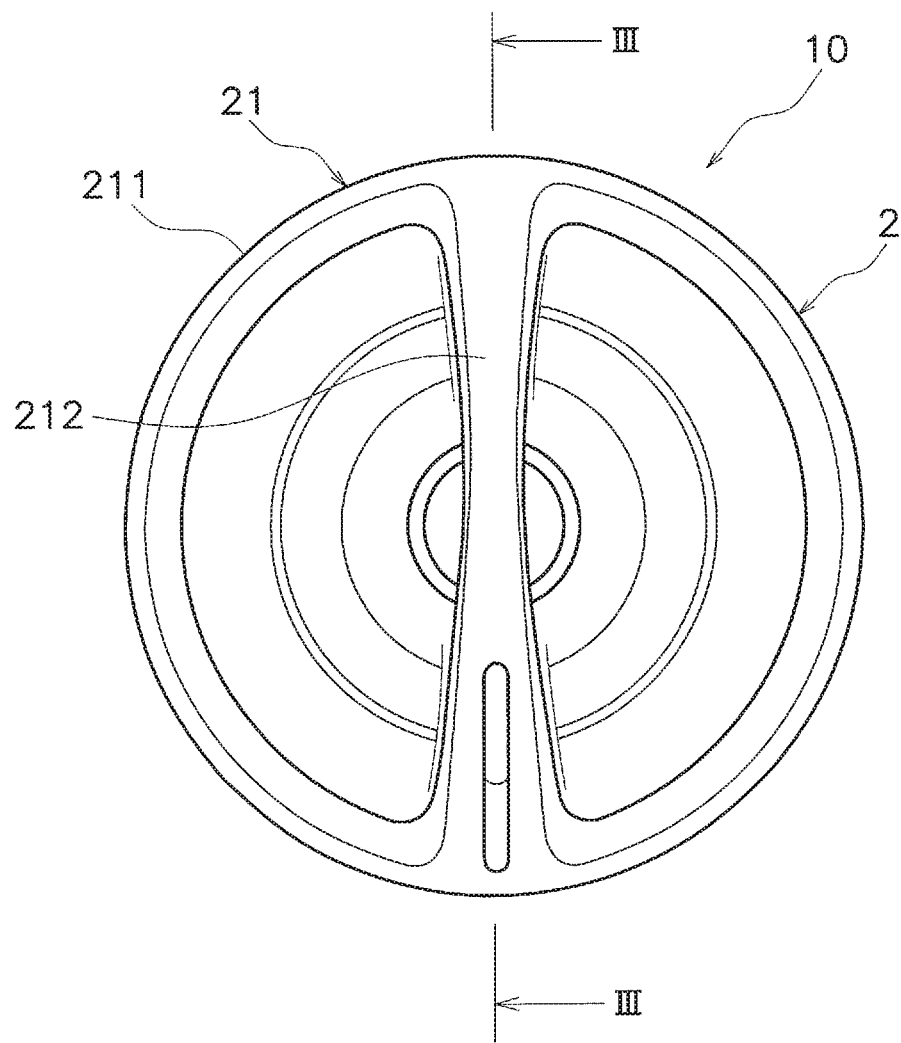
FIG. 2 is a front view of a drag knob.
Figure 3:
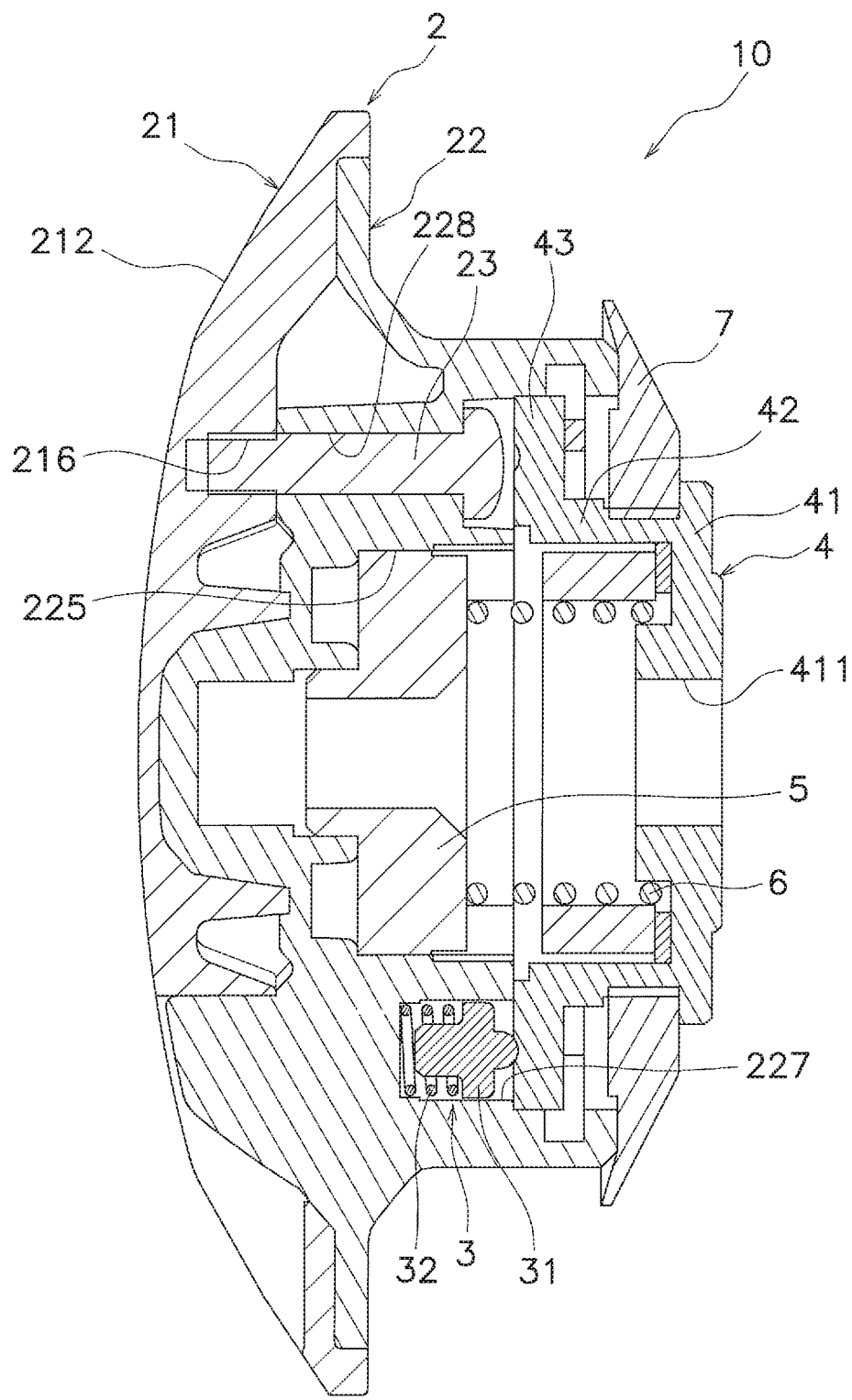
FIG. 3 is a cross-sectional view along line III-III in FIG. 2.
Figure 4:
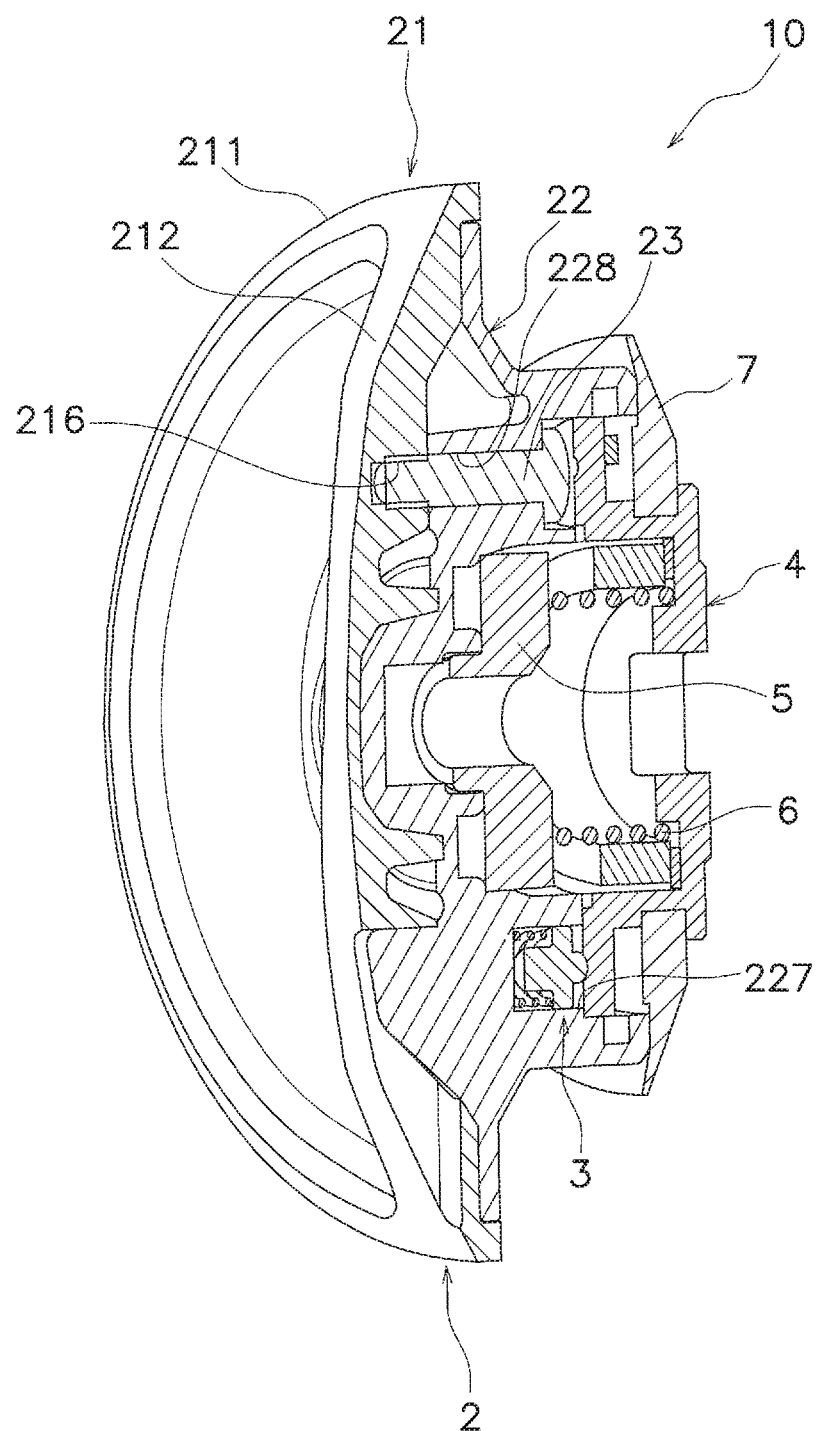
FIG. 4 is a perspective view of FIG. 3.

As shown in FIGS. 2 to 4, the drag knob 10 has an operating member 2, a sounding member 3, a receiving member 4, a moving member 5, a first biasing member 6, and a seal member 7.

[Operating Member]

The operating member 2 is rotatably attached to the reel body 11. More specifically, the operating member 2 is rotatably attached to the spool shaft 17 via the moving member 5. The operating member 2 has a cover 21, an insert 22, and a bolt 23 (an example of a fixing member).

[Cover]

Figure 5:
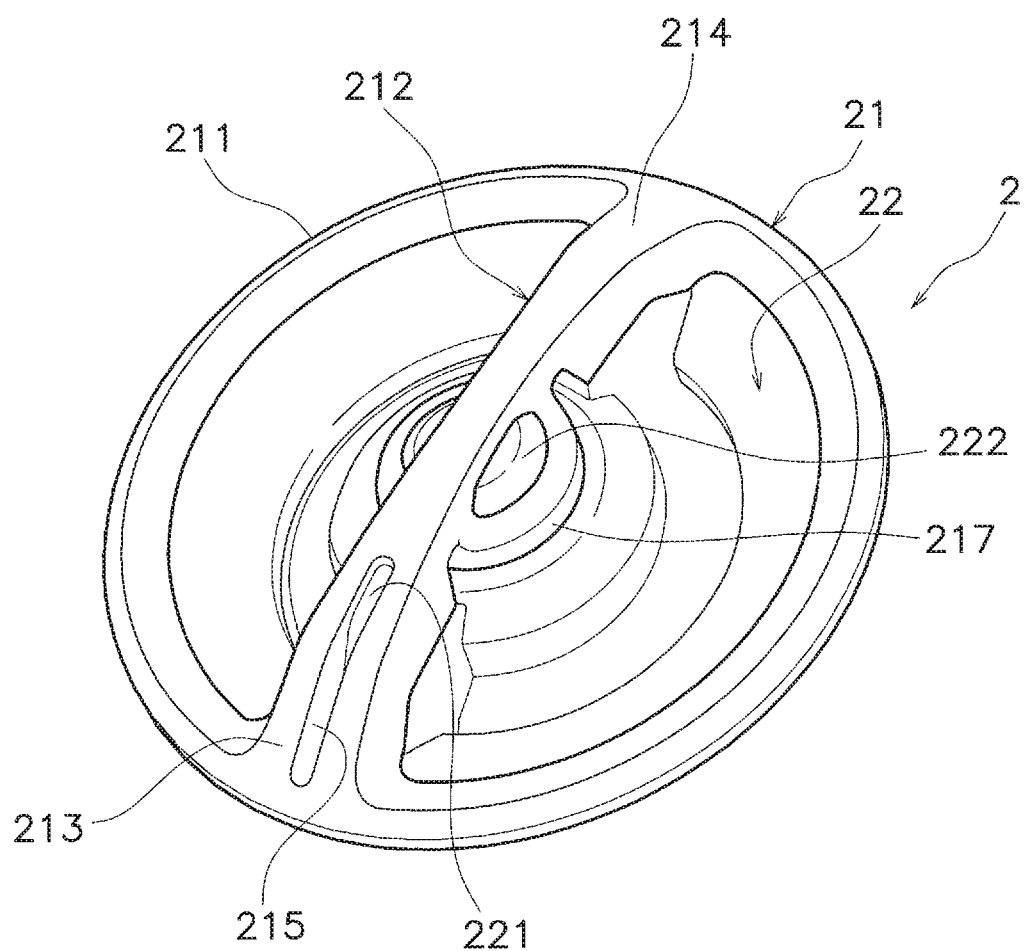
FIG. 5 is a perspective view of an operating member.
Figure 6:
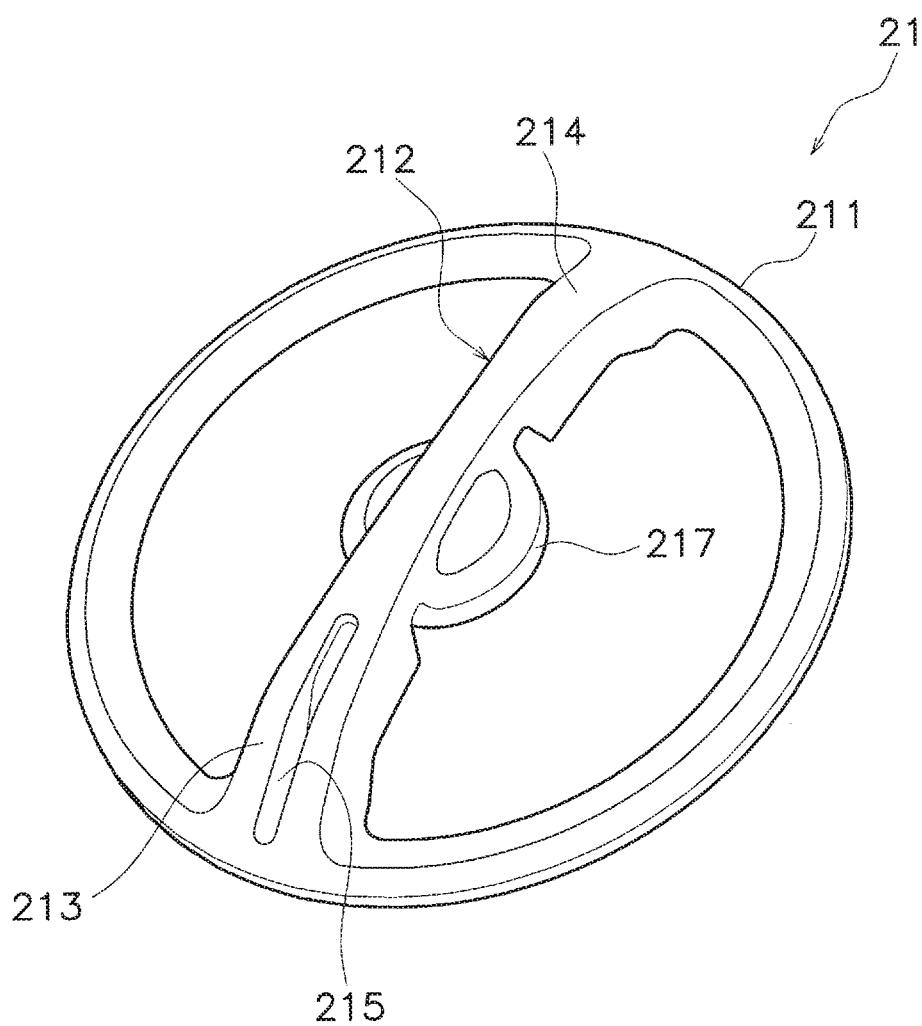
FIG. 6 is a perspective view of a cover.

As shown in FIGS. 5 and 6, the cover 21 has an annular part 211 and a knob 212. The annular part 211 has a circular shape and constitutes the outer peripheral edge of the operating member 2.

The knob 212 extends in the radial direction. A user grips the knob 212 to rotate the operating member 2. The knob 212 has a first end 213 and a second end 214 in the radial direction. The first and second ends 213, 214 of the knob 212 are connected to the annular part 211. In detail, the knob 212 and the annular part 211 are formed of one member.

The knob 212 has a slit 215 extending in the radial direction. As shown in FIGS. 3 and 4, the knob 212 has a screw hole 216 on a rear surface thereof. The slit 215 is disposed on a first end 213 side of the knob 212, and the screw hole 216 is disposed on a second end 214 side of the knob portion 212. The "first end 213 side of the knob 212" means a side more toward the first end 213 of the knob 212 than the rotation axis thereof, while the "second end 214 side of the knob 212" means a side more toward the second end 214 of the knob 212 than the rotation axis thereof.

As shown in FIG. 6, the knob portion 212 has an annular attachment 217 in the central portion thereof. The attachment 217 has a through-hole in the center.

[Insert]

As shown in FIGS. 3 to 5, the insert 22 is attached to the cover 21. The bolt 23 attaches the insert 22 to the cover 21. The bolt 23 is screwed into the screw hole 216 of the cover portion 21.

Figure 7:
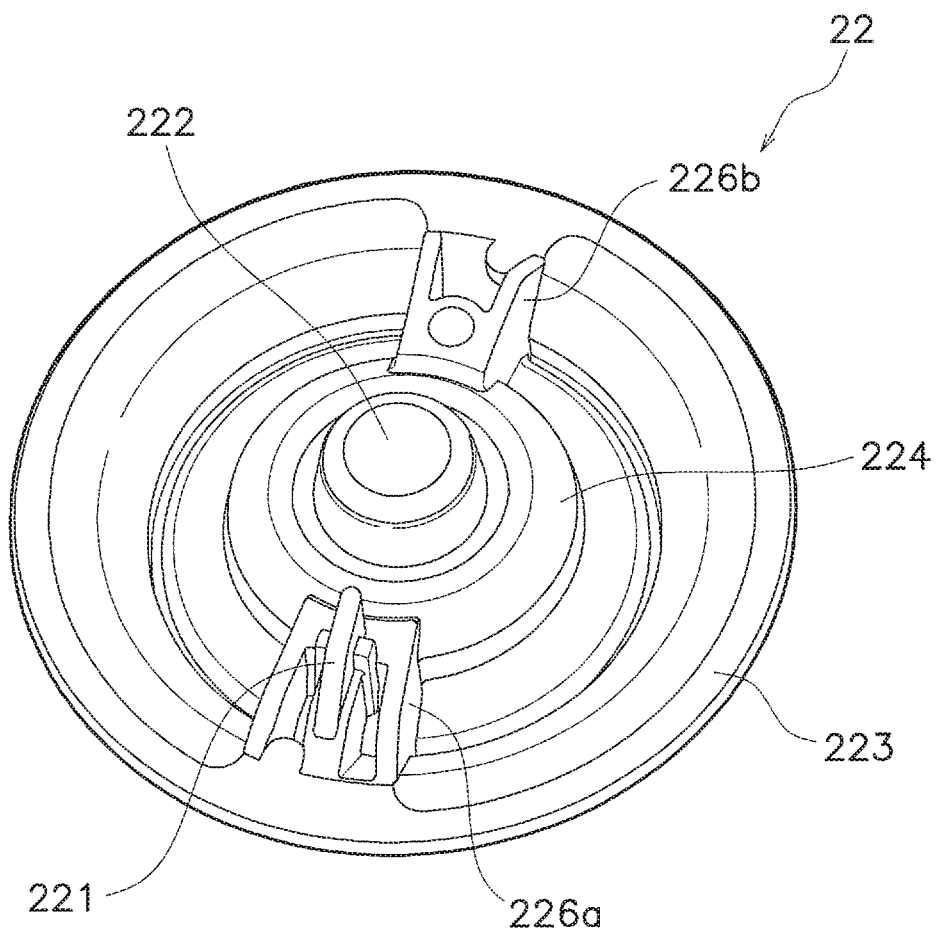
FIG. 7 is a perspective view of an insert.

As shown in FIG. 7, the insert 22 has a first projection 221 and a second projection 222. The first projection 221 extends in the radial direction. The first projection 221 is plate-shaped and protrudes frontward. The second projection 222 has a cylindrical shape and projects frontward. The second projection 222 is disposed in the central portion of the insert 22.

As shown in FIG. 5, in a state in which the insert 22 is attached to the cover 21, the first projection 221 is fitted in the slit 215. Further, the second projection 222 is fitted in the through-hole of the attachment 217. The first projection 221 is disposed on the first end 213 side of the knob 212, and the bolt 23 is disposed on the second end 214 side of the knob 212. In this way, the first projection 221 and the bolt 23 are symmetrically disposed.

As shown in FIG. 7, the insert 22 has an outer circumferential wall 223 and an inner circumferential wall 224. The outer circumferential wall 223 is configured such that the diameter thereof increases toward the front. A distal end surface of the outer circumferential wall 223 is in contact with a rear surface of the annular part 211 of the cover 21.

The inner peripheral wall 224 is disposed spaced apart in the radial direction from the outer peripheral wall 223. The inner peripheral wall 224 is configured such that the diameter thereof decreases toward the front. As shown in FIG. 3, the inner peripheral wall 224 defines a fitting concavity 225 on a rear surface of the insert 22.

The moving member 5 fits in the fitting concavity 225. For example, the contour of the fitting concavity 225 in the axial view is substantially the same as the contour of the moving member 5. Therefore, the insert 22 and the moving member 5 rotate integrally. The moving member 5 is movable in the axial direction with respect to the insert 22.

As shown in FIG. 7, the insert 22 has first and second support walls 226a and 226b. The first and second support walls 226a and 226b project forward. The first and second support walls 226a and 226b extend in the radial direction between the outer peripheral wall 223 and the inner peripheral wall 224. The first support wall 226a and the second support wall 226b are disposed symmetrically with respect to the rotation axis.

The first support wall 226a is disposed to the rear of the knob 212 and on the first end 213 side thereof. The first support wall 226a supports the first end 213 side of the knob 212 from the rear. The second support wall 226b is disposed to the rear of the knob 212 and on the second end 214 side thereof. The second support wall 226b supports the second end 214 side of the knob 212 from the rear.

The first projection 221 projects forward from the first support wall 226a. As shown in FIGS. 3 and 4, a housing recess 227 is formed so as to extend in the first support wall 226a. The second support wall 226b has a through-hole 228 that penetrates in the axial direction. The bolt 23 passes through the through-hole 228.

[Bolt]

As described above, the bolt 23 attaches the insert 22 to the cover 21. More specifically, the bolt 23 passes through the through-hole 228 of the insert 22 to be screwed into the screw hole 216 of the cover 21.

In the present embodiment, the operating member 2 has only the one bolt 23 for attaching the insert 22 to the cover 21. The bolt 23 is disposed so as to overlap with the knob 212 when viewed in the axial direction. More specifically, the bolt 23 is disposed so as to overlap with the second end 214 side of the knob 212 when viewed in the axial direction.

[Moving Member]

The moving member 5 rotates integrally with the operating member 2. The moving member 5 is movable in the axial direction with respect to the operating member 2. The moving member 5 is, for example, a nut or the like. The moving member 5 is screwed into the distal end of the spool shaft 17. Therefore, the moving member 5 moves back and forth in the axial direction by the rotation of the operating member 2.

When the moving member 5 moves rearward (to the right in FIG. 3), the first biasing member 6 is compressed, whereby the biasing force exerted by the first biasing member 6 increases. As a result, the force of the receiving member 4 pressing the drag mechanism 20 increases, and the rotation of the spool 12 is braked. On the other hand, when the moving member 5 moves forward (to the left in FIG. 3), the biasing force exerted by the first biasing member 6 decreases. As a result, the force of the receiving member 4 pressing the drag mechanism 20 decreases, whereby the spool 12 can rotate.

[Receiving Member]

The receiving member 4 is a member for receiving the biasing force of the first biasing member 6 and applying drag force to the spool 12. The receiving member 4 has a disk part 41, a cylindrical part 42, and a flange 43. The receiving member 4 is attached to the spool shaft 17. The receiving member 4 is non-rotatable and movable in the axial direction.

The disk part 41 has a through-hole 411 in the center thereof. The disk part 41 has a pair of flat surfaces in an inner peripheral surface defining the through-hole 411. The pair of flat surfaces are in engagement with the pair of flat surfaces of the spool shaft 17. Therefore, the receiving member 4 cannot rotate with respect to the spool shaft 17.

Figure 8:
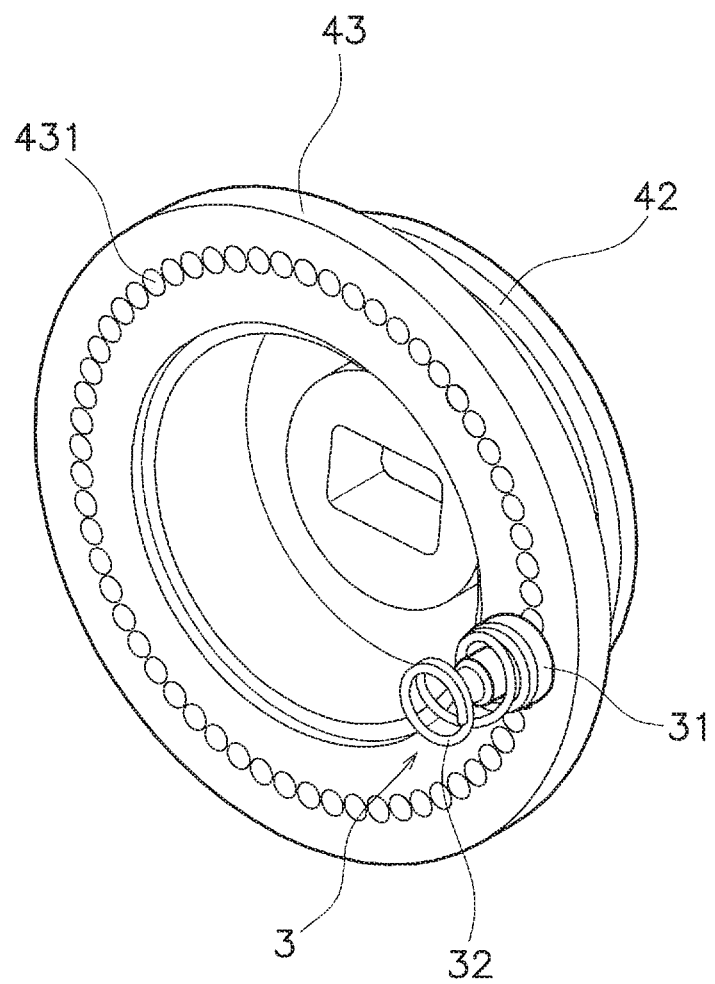
FIG. 8 is a perspective view of a sounding member and a receiving member.

The cylindrical part 42 extends forward from an outer peripheral edge of the disk part 41. The flange 43 extends radially outward front a distal end of the cylindrical part 42. As shown in FIG. 8, a plurality of recesses 431 are formed in a front face of the flange 43. The recesses 431 are arranged in the circumferential direction.

[First Biasing Member]

As shown in FIG. 3, the first biasing member 6 is disposed between the moving member 5 and the receiving member 4. The first biasing member 6 biases the receiving member 4 rearward. The first biasing member 6 is, for example, a coil spring in a compressed state.

[Seal Member]

The seal member 7 is attached to the cylindrical part 42 of the receiving member 4. The seal member 7 is configured to prevent water ingress between the operating member 2 and the receiving member 4.

[Sounding Member]

The sounding member 3 is configured to generate a percussive sound by rotation of the operating member 2, and is one example of a sounding means for causing a sound to be produced by rotation of the operating member 2. Specifically, the sounding member 3 has a striking pin 31 and a second biasing member 32. Note that the second biasing member 32 corresponds to the biasing member of the present disclosure.

The sounding member 3 is housed in the housing recess 227. Therefore, the sounding member 3 is disposed so as to overlap with the knob 212 when viewed in the axial direction. Specifically, the sounding member 3 is disposed so as to overlap with the first end 213 side of the knob 212 when viewed in the axial direction. The sounding member 3 is arranged substantially symmetrically with the bolt 23, centered on the rotation center O.

The striking pin 31 is biased toward the receiving member 4 by the second biasing member 32. The striking pin 31 is one example of a striking means, and the second biasing member 32 is one example of a biasing means. As shown in FIG. 8, the striking pin 31 abuts the inner wall surface of each recess 431 of the receiving member 4. When the operating member 2 is rotated, the sounding member 3 rotates about the rotation center O, while the receiving member 4 does not rotate. As a result, the striking pin 31 of the sounding member 3 impacts the receiving member 4, causing sound to be generated.

[Modifications]

Although an embodiment of the present disclosure has been described in detail above, it is to be understood that the present disclosure is not limited to the embodiment, and various modifications may be made within a scope not departing from the gist of the disclosure.

(a) In the present embodiment, although the operating member 2 has only one bolt 23 for attaching the insert 22 to the cover 21, a plurality of the bolts 23 may also be provided. In such a case, it is preferable that the plurality of bolts 23 be arranged only in an area overlapping with the knob 212 when viewed in the axial direction.

(b) In the present embodiment, although the insert 22 is attached to the cover 21 using the bolt 23 as a fixing member, the insert 22 may be attached to the cover 21 by a fixing member other than the bolt 23.

(c) In the present embodiment, although the sounding member 3 is composed of the striker pin 31 and the second biasing member 32, the configuration of the sounding member 3 is not limited thereto.

EXPLANATION OF REFERENCE NUMERALS

2 Operating member
21 Cover
212 Knob
213 First end
214 Second end
22 Insert
23 Bolt
3 Sounding member
4 Receiving member
6 Biasing member
11 Reel body
12 Spool
20 Drag mechanism

What is claimed is:

1. A drag knob assembly for adjusting drag force of a drag mechanism that brakes rotation of a spool rotatably attached to a reel body of a fishing reel, the drag knob assembly comprising:
an operating member that is rotatably attached to the reel body, the operating member including a cover, an insert that is attached to the cover, and a fixing member for attaching the cover to the insert, wherein the cover includes a knob that extends in a radial direction thereof, the knob including a slit extending through an outer surface of the knob and the insert including a projection adapted to be fitted in the slit, and
a sounding member that causes a percussive sound to be produced by rotation of the operating member;
wherein the fixing member and the sounding member are disposed so as to overlap with the knob when viewed in an axial direction thereof.

2. The drag knob assembly according to claim 1, wherein the knob includes a first end and a second end in the radial direction, the first end and the second end defining a first end side of the knob and a second end side of the knob, respectively;
the sounding member is disposed so as to overlap with the first end side of the knob when viewed in the axial direction; and
the fixing member is disposed so as to overlap with the second end side of the knob when viewed in the axial direction.

3. The drag knob assembly according to claim 1, wherein the fixing member comprises at least one bolt, and is disposed only in an area overlapping with the knob when viewed in the axial direction.

4. The drag knob assembly according to claim 1, wherein the fixing member has only one bolt.

5. The drag knob assembly according to claim 1, further comprising:
a receiving member having a plurality of recesses arranged in a circumferential direction thereof, the receiving member non-rotatably attached to the reel body;
wherein the sounding member includes a striking pin and a biasing member that biases the striking pin toward each recess of the receiving member.

6. The drag knob assembly according to claim 1, wherein the knob includes a first end and a second end in the radial direction, the first end and the second end defining a first end side of the knob and a second end side of the knob, respectively;
the sounding member is disposed so as to overlap with the first end side of the knob when viewed in the axial direction.

7. The drag knob assembly according to claim 6, wherein the fixing member comprises a single bolt disposed so as to overlap with the second end side of the knob when viewed in the axial direction.

8. A fishing reel, comprising:
a reel body;
a spool that is rotatably mounted on the reel body;
a drag mechanism that brakes rotation of the spool; and
a drag knob assembly for adjusting the drag force of the drag mechanism, the drag knob assembly including
an operating member that is rotatably attached to the reel body, the operating member including a cover, an insert that is attached to the cover, and a fixing member for attaching the cover to the insert, wherein the cover includes a knob that extends in a radial direction thereof, the knob including a slit extending through an outer surface of the knob and the insert including a projection adapted to be fitted in the slit, and
a sounding member that causes a percussive sound to be produced by rotation of the operating member;
wherein the fixing member and the sounding member of the drag knob are disposed so as to overlap with the knob when viewed in an axial direction thereof.

9. The fishing reel according to claim 8, wherein the knob includes a first end and a second end in the radial direction, the first end and the second end defining a first end side of the knob and a second end side of the knob, respectively;
the sounding member is disposed so as to overlap with the first end side of the knob when viewed in the axial direction; and
the fixing member is disposed so as to overlap with the second end side of the knob when viewed in the axial direction.

10. The fishing reel according to claim 8, wherein the fixing member comprises at least one bolt, and is disposed only in an area overlapping with the knob when viewed in the axial direction.

11. The fishing reel according to claim 8, wherein the fixing member comprises a single bolt.

12. The fishing reel according to claim 8, further comprising:
a receiving member having a plurality of recesses arranged in a circumferential direction thereof, the receiving member non-rotatably attached to the reel body;
wherein the sounding member includes a striking pin and a biasing member that biases the striking pin toward each recess of the receiving member.

* * * * *